Oct. 25, 1938.  G. H. LE BOEUF  2,134,635
AUTOMOBILE BAGGAGE CARRIER
Filed Aug. 1, 1935  2 Sheets-Sheet 1
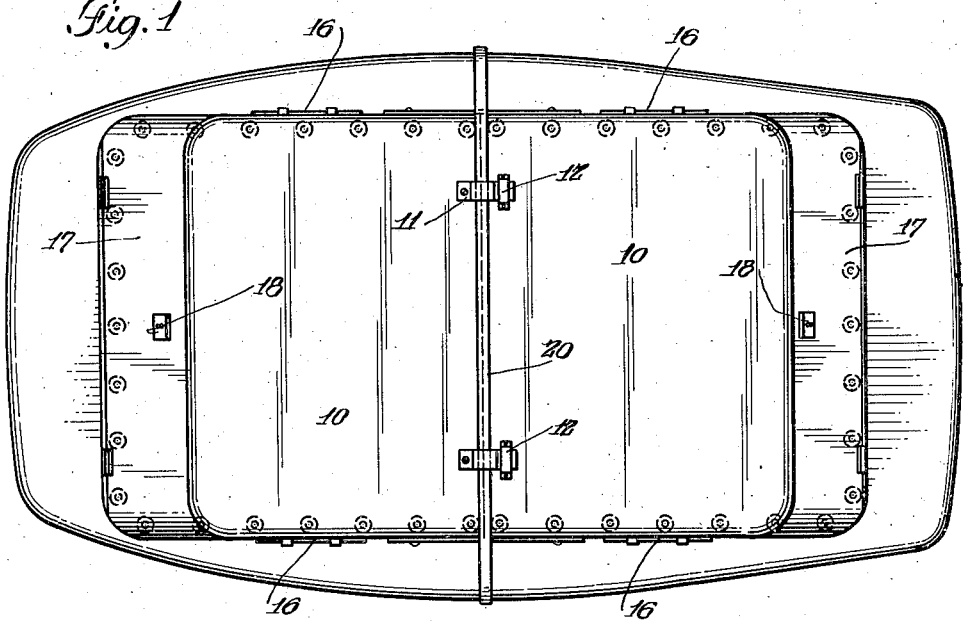
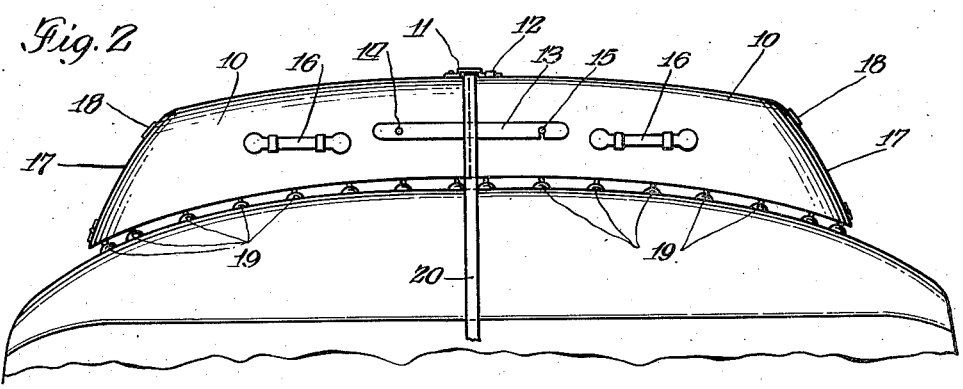
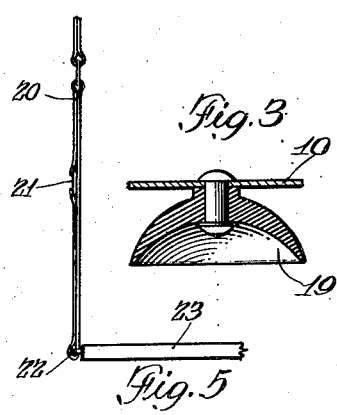
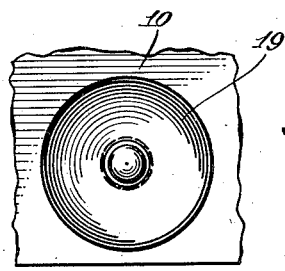
Inventor:
George H. Le Boeuf.
By: Brayton Richards
Attorney.

Oct. 25, 1938.  G. H. LE BOEUF  2,134,635
AUTOMOBILE BAGGAGE CARRIER
Filed Aug. 1, 1935  2 Sheets-Sheet 2
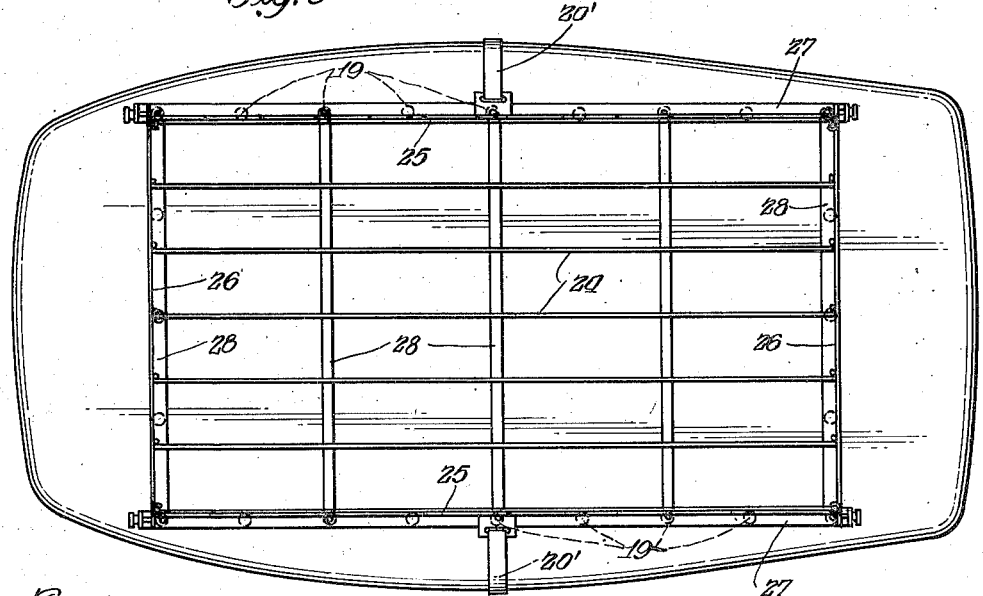
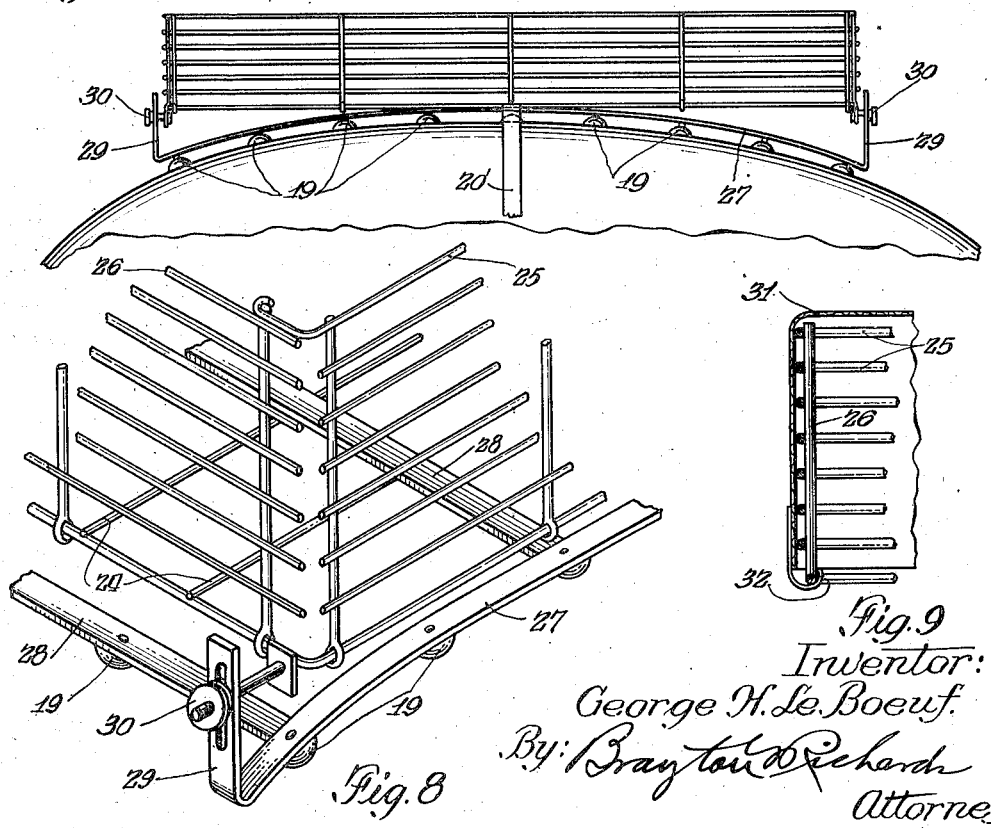
Inventor:
George H. Le Boeuf.
By: Brayton Richards
Attorney.

Patented Oct. 25, 1938

2,134,635

UNITED STATES PATENT OFFICE 2,134,635

AUTOMOBILE BAGGAGE CARRIER

George H. Le Boeuf, Green Bay, Wis.

Application August 1, 1935, Serial No. 34,172

1 Claim. (Cl. 224—29)

The invention relates to improvements in automobile baggage carriers and has for its primary object the provision of an improved construction of the class indicated which is capable of economical production and highly efficient in use.

Another object of the invention is the provision of an improved construction of the character indicated constructed and arranged to be readily mounted upon and secured to the top or roof of an ordinary automobile body.

Other objects will appear hereinafter.

The invention consists in the combinations and arrangements of parts hereinafter described and claimed.

The invention will be best understood by reference to the accompanying drawings forming a part of this specification, and in which Fig. 1 is a top plan view of an automobile baggage carrier embodying the invention and shown in position of use;

Fig. 2 a partial side view of the same;

Fig. 3 an enlarged detailed section through one of a plurality of vacuum suction cups employed in the construction;

Fig. 4 a bottom plan view of one of said cups;

Fig. 5 a detailed view illustrating a detachable connection with the running board of the automobile employed in the construction;

Fig. 6 a view similar to Fig. 1 but showing a modified form of carrier;

Fig. 7 a partial side view of the same;

Fig. 8 a perspective view of one corner of the carrier illustrated in Figs. 6 and 7; and Fig. 9 a detailed section through one end of the modified form of carrier showing a detachable waterproof cover in position of use.

The embodiment of the invention illustrated in Figs. 1, 2, 3, 4, and 5 comprises a trunk-like receptacle made in two detachable sections 10. One of the sections 10 carries on its top two brackets 11 each provided with a forwardly extending tongue adapted and arranged to span the plane of division between the sections and engage under straps 12 secured as shown to the other section. Securing bars 13 are pivoted at 14 to the sides of one of said sections and are provided with slotted connections with studs 15 on the other section and whereby said sections may be readily and detachably secured to each other, as will be readily understood. Suitable handle members 16 are provided as shown on opposite sides of the sections 10 to facilitate handling of the same. At their ends the sections 10 are provided with downwardly swinging doors or closures 17 equipped with suitable locks 18 and whereby access to the interior of the sections 10 is afforded.

The sections 10 are shaped as shown to conform substantially to the top of the body of an ordinary automobile and are equipped with a plurality of rubber vacuum suction cups 19 adapted and arranged to contact with and adhere to the top of the automobile. A securing strap 20 is arranged as shown to pass across the top of the sections 10 under the brackets 11 and carries at each side buckles 21 and attaching members 22 adapted and arranged to engage the running boards 23 of the automobile body. By this arrangement a baggage receptacle is provided which may be readily applied to or detached from the top of an ordinary automobile body. The suction cups 19 not only constitute resilient supports for the receptacle but also engage the top of the automobile to prevent slippage and consequent wear or marring thereof. Owing to the fact that the receptacle is made in two parts and the tongues of the brackets 11 span the plane of division between the sections sufficient flexibility to the structure is afforded to permit it to adjust itself to the top of the automobile and at the same time a single securing strap will afford the necessary downward pressure. The form and arrangement of securing bars 13 gives the structure sufficient lateral rigidity and at the same time permit of this vertical flexibility for adaptation to the top of the automobile. The specific form and arrangement of parts is a simple and effective one for the purpose.

In the modification illustrated in Figs. 6, 7, 8 and 9, the baggage receptacle is formed of open framework construction comprising an open framework bottom 24, open framework sides 25 and open framework ends 26, the sides and ends being arranged as indicated to fold inwardly upon the bottom 24 and each other so that said receptacle may be folded into compact form.

The baggage receptacle thus provided is supported on a spring frame consisting of curved spring side bars 27 secured centrally to the bottom of the receptacle and curving as shown to conform substantially to the curvature of the top of the automobile. The side bars 27 are connected by cross bars 28 as shown. Each of the side bars 27 is provided at each end with upwardly extending slotted legs 29 adjustably attached to the ends of the receptacle by means of clamping members 30, as indicated. The side bars 27 and the end bars 28 are equipped as shown with the rubber vacuum cups 19 adapted and arranged to contact with and adhere to the top of the automobile body, as above described.

By this arrangement a foldable light receptacle or carrier is provided which may be readily attached to or detached from the top of an automobile body.

The receptacle is further secured in place by means of straps 20' equipped with the buckles 21 and the attaching members 22 so that the receptacle may be secured to the automobile body independently of the suction cups.

A flexible waterproof cover 31 is also provided for the receptacle 24—25—26, so as to protect the contents thereof from the weather. The sides of the cover 31 are provided with hooks 32 engaging the lower bars of the sides and ends of the receptacle to hold said cover member in place, as shown.

By this arrangement, a simple and efficient baggage carrier is provided which is much lighter in weight and may be folded into compact form. Otherwise the construction and arrangement is substantially the same as the form already described.

While I have illustrated and described the preferred forms of construction for carrying my invention into effect, these are capable of variation and modification without departing from the spirit of the invention. I therefore do not wish to be limited to the precise details disclosed but desire to avail myself of such modifications and variations as fall within the scope of the appended claim.

I claim:

A construction of the class described comprising a baggage receptacle made in two longitudinally separable parts divided transversely at the center thereof having their bottoms arranged to rest on the top of an automobile; U-shaped straps on the top of one of said sections, elongated offset brackets on the other section spanning the plane of division and adapted to be engaged in the said U-shaped straps; and a tie strap extending over said receptacle under said offset brackets and having its ends adapted to be secured to the body of an automobile.

GEORGE H. LE BOEUF.